Figure 1:
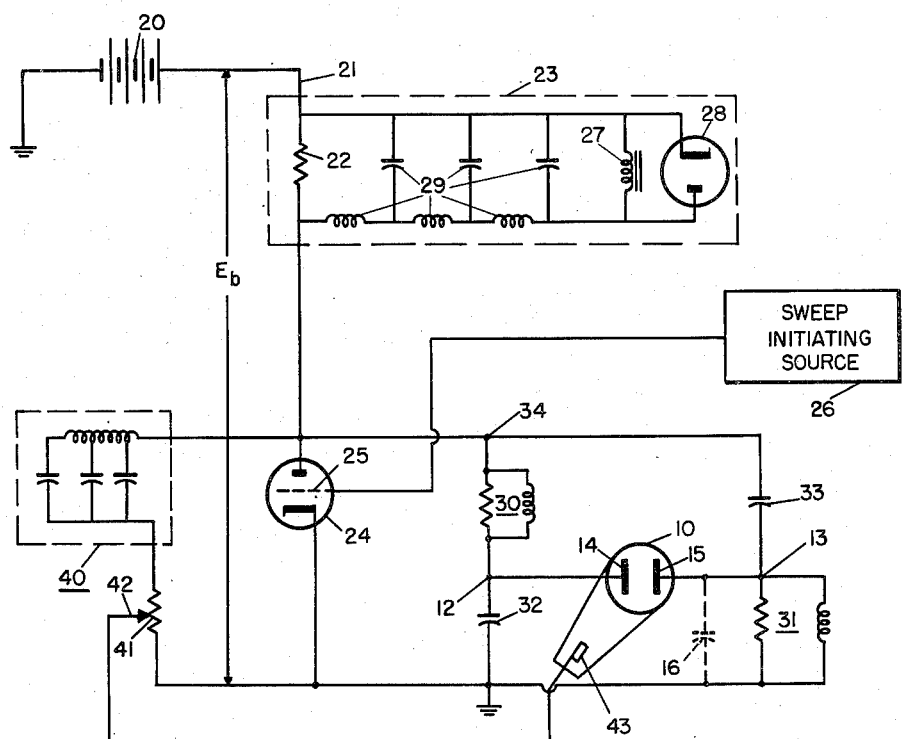

Sept. 30, 1952        D. F. WINTER        2,612,620

BRIDGE TYPE DEFLECTION CIRCUIT

Filed Sept. 9, 1950

INVENTOR.
DAVID F. WINTER
BY Darby & Darby
ATTORNEYS

Patented Sept. 30, 1952

2,612,620

UNITED STATES PATENT OFFICE 2,612,620

BRIDGE TYPE DEFLECTION CIRCUIT

David F. Winter, St. Louis, Mo., assignor to Allen B. Du Mont Laboratories, Inc., Clifton, N. J., a corporation of Delaware Application September 9, 1950, Serial No. 183,992

10 Claims. (Cl. 315—22)

This invention relates to a circuit for generating balanced sweep voltages, and an unblanking gate voltage for a cathode ray tube indicator or like device.

In common or conventional balanced sweep circuits, the tubes generating the sawtooth sweep voltages carry current at all times during the period the instrument is in use. Accordingly, it is a fundamental object of this invention to produce a balanced sweep voltage which will eliminate the necessity for a quiescent current substantially equal to the sweep current in the tube which generates the positive sawtooth voltage.

Although the quiescent current used by the tube normally is not a serious problem for relatively slow sweep speeds, it becomes a prohibitive factor where sweep speeds in excess of five inches per microsecond in high voltage cathode ray tubes are needed. For example, a conventional sweep circuit for use with a 5 RP cathode ray tube would require approximately two hundred fifty watts power dissipation during standby conditions to develop a sweep speed of 40 inches per microsecond.

It is, therefore, a second object of the invention to provide a sweep circuit useful with high voltage cathode ray tubes, which eliminates the excessive power dissipation requirement for these tubes during their standby periods.

Since the circuit comprising the instant invention requires no quiescent switch tube power, and dissipates energy only during the sweep and recharge time for the circuit elements, which for high sweep speeds amounts to only a fraction of the total time in operation, material advantages are gained therefrom. For example, this circuit requires only twenty-five watts to produce a sweep in a five inch tube having a speed of 40 inches per microsecond at a repetition frequency of one megacycle per second, as compared to the two-hundred-fifty watt dissipation mentioned for conventional circuits.

Another object of the invention is to provide an unblanking beam voltage to effect the switching on of the beam simultaneously with the start of the sweep voltage.

It is still another object of the invention to provide a circuit which will produce a sweep voltage having substantially twice the amplitude of the voltage of the power supply for the tube.

Other objects and advantages of the invention will in part be obvious and in part appear hereinafter.

In accordance with the invention, the sweep voltage is shaped by the elements of a bridge circuit, while the switch tube acts merely as a switch and not as an amplifier. The elements of the bridge circuit include inductances and capacitances in the arms thereof having the cathode ray tube deflection plates connected across the diagonal of the bridge, and also recharging means in the plate circuit of the switch tube. The amount of power consumed by this circuit is dependent upon the duty cycle thereof, whereas the amount of power taken by the conventional circuit is essentially independent of the duty cycle. Thus, the invention is embodied in a circuit having the elements and combination of elements as described in further detail below.

In the drawings:

Figure 1 shows in diagrammatic form one embodiment of the invention in which a cathode ray tube 10 has its horizontal deflection plates 14—15 connected to points 12 and 13 respectively on one diagonal of a bridge circuit which is the source of a sweep voltage for a cathode ray tube.

For description and analysis of the operation of the sweep circuit it is best to start at the high voltage power supply for the circuit. Source 20 supplies high voltage, $E_b$, through line 21, resistor 22, which resistor forms a portion of recharge circuit 23, to switch tube 24. Recharge circuit 23 incorporates an inductance 27 and a diode 28 connected in parallel at the opposite end of the network 29 from the resistor 22, and serves to insure a quick return of the voltage at the plate of tube 24 to the voltage of the source 20 without appreciable overswing. The cathode of the switch tube 24 is connected to ground. The control grid 25 of the switch tube receives the sweep initiating pulses from source 26.

The bridge circuit proper comprises a pair of networks 30 and 31, which are substantially identical and comprise in each case an inductance and a resistance or other shaping means. In series with each of the networks is a capacitor. Thus capacitor 32 is in series with network 30 and capacitor 33 is in series with network 31. The two pairs of elements, network 30 and capacitor 32, with capacitor 33 and network 31, are connected in parallel to form a four-armed bridge across which cathode ray tube 10 is connected. Thus the two arms of the bridge including the network 30 and capacitor 33 are connected together at point 34, which point is connected to the plate of the switch tube. In similar fashion the two arms of the bridge comprising network 31 and capacitor 32 are grounded. Thus it will be seen that switch tube 24 is essentially in parallel with the bridge, or across that diagonal opposite to that of the cathode ray tube 10.

It will be obvious that in place of capacitors 32 and 33 a direct voltage isolating element, which may be a gaseous voltage regulator tube in combination with shaping elements, such as inductors, capacitors and resistors, may be used.

An additional network 40 is connected between the plate of the switch tube 24 through potentiometer 41, having contact point 42, to ground. This contact point 42 is connected to the cathode of the electron gun 43 of the cathode ray tube 10.

Figure 2:
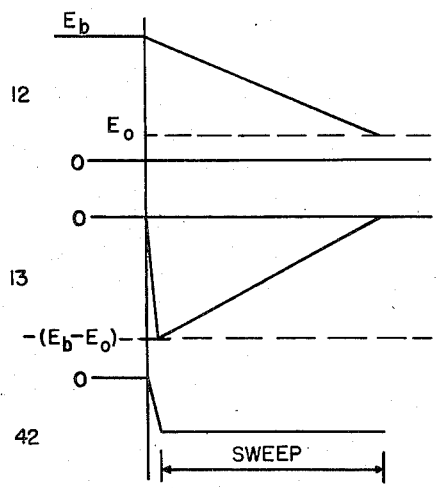

The operation of the circuit may be understood by reference to the circuit shown in Figure 1, and the voltage curves in Figure 2. Normally, the control grid 25 of the switch tube 24 is held at a negative potential and keeps the tube completely non-conducting until such time as a sweep voltage is desired.

The operation of the circuit is as follows: When the potential on the control grid 25 of switch tube 24 is raised to a sufficiently high positive level by the application of a positive pulse from the sweep initiating source 26, the switch tube conducts and discharges capacitor 32 through network 30, capacitor 33 through network 31 and the capacitance of network 40 through potentiometer 41. These several discharge currents generate several voltages shown in the time synchronized curves of Figure 2.

Thus the discharge of capacitor 32 through the network 30 causes the voltage at point 12 of the network which is connected to deflection plate 14 of cathode ray tube 10, to drop in a manner which is a function of the characteristics of the network and reaches the potential designated $E_0$ on the diagram in Figure 2. $E_0$ is the voltage across switch tube 24 during conduction. When tube 24 is a gas thyratron this would be the ionization potential. When it is a hard tube this value will depend upon the cathode emission properties. $E_0$ is the voltage across switch tube 24 during conduction. When tube 24 is a gas thyratron this would be the ionization potential. When it is a hard tube this value will depend upon the cathode emission properties. $E_0$ is shown at 12 in Figure 2.

At the same time the voltage on deflection plate 15 which is connected to point 13 diagonally opposite from 12 on the bridge, drops rapidly from its quiescent value of zero to a value $-(E_b-E_0)$ in a time depending upon the current passing through the tube 24 and the distributed capacitance 16 between this plate of the cathode ray tube and ground. It then rises toward zero at a rate determined by the characteristics of network 31 and of the capacitor 33. This latter voltage change is shown at 13 in Figure 2. Thus there is produced an equal balanced voltage change on the two deflection plates of the cathode ray tube simultaneously. The voltage across potentiometer 41 will be a negative pulse designated 42 in Figure 2, the shape of which will be determined by the pulse forming network 40, which may be applied to the cathode of the cathode ray tube to effectively reduce its voltage with respect to its grid voltage, thus causing the beam to increase in intensity.

Though the invention has been described with only a single embodiment it will be apparent that variations thereof may be made without departing from the spirit or scope of the invention.

What I claim is:

1. A deflection circuit for a cathode ray tube having deflection plates comprising a bridge including a series connection of reactive elements in each of two sides, said deflection plates being connected across one diagonal of said bridge and a source of potential being connected across the second diagonal of said bridge.

2. A deflection circuit for a cathode ray tube having deflection plates comprising a bridge including a capacitor in series with a parallel connected resistance-inductance network in each of two sides, said deflection plates being connected across one diagonal of said bridge and a source of potential being connected across the second diagonal of said bridge.

3. A deflection circuit for a cathode ray tube having deflection plates comprising a bridge having four arms, one arm including a first capacitor, a second arm connected thereto including a first parallel-connected resistance-inductance network, a third arm connected thereto including a second capacitor and a fourth arm connected thereto and to said first arm including a second parallel-connected resistance-inductance network, said deflection plates being connected across one diagonal of said bridge.

4. A circuit in accordance with claim 3 including a cathode ray tube having its deflection means connected diagonally across said bridge between the point of connection between said first capacitor and said first network and between said second capacitor and said second network, and a discharge tube connected across said bridge between said first capacitor and said second network and said first network and said second capacitor.

5. The circuit in accordance with claim 4 in which the plate circuit of said discharge tube includes a charging circuit.

6. The circuit in accordance with claim 5 in which a pulse forming network is connected between the plate of said discharge tube and the cathode of said cathode ray tube.

7. A device in accordance with claim 6 in which said pulse forming network is connected to said cathode ray tube cathode through a potentiometer.

8. A deflection circuit for a cathode ray tube having at least two deflection plates and a cathode, which comprises a source of voltage, a grid controlled thermionic tube having a plate, cathode, and a grid, normally biased to cutoff, said cathode being grounded, a first arm of a bridge circuit including a first capacitor connected thereto, a second arm of said bridge comprising a parallel-connected resistance-inductance network connected in series with said first capacitor between said plate and the cathode of said thermionic tube, a third arm of said bridge including a second capacitor connected in series with a second network comprising a parallel-connected resistance-inductance network between said plate and the cathode of said thermionic tube, said first capacitor being connected also to said plate, the junction of said second network and said second capacitor being connected to one of said deflection plates of said cathode ray tube, the junction of said first capacitor and said first network being connected to the other of said deflection plates, a third network comprising inductance and capacitance connected in series-parallel relation in series with a potentiometer having an adjustable tap, said third network being connected also to said plate of said thermionic tube, said potentiometer being connected to the cathode of said thermionic tube, said adjustable tap being connected to the cathode of said cathode ray tube, and a sweep initiating source connected to the control grid of said thermionic tube to initiate conductance therein.

9. The circuit of claim 8 in which said thermionic tube comprises a gaseous discharge tube.

10. A deflection circuit for a cathode ray tube having at least two deflection plates and a cathode, which comprises a source of voltage, a switching device comprising a first terminal and a second terminal, said second terminal being grounded, means for operating said switching device, said device being normally non-conducting, a first arm of a bridge circuit including a first capacitor connected thereto, a second arm of said bridge comprising a parallel-connected resistance-inductance network connected in series with said first capacitor between said first terminal and said second terminal, a third arm of said bridge including a second capacitor connected in series with a second network comprising a parallel-connected resistance-inductance network between said first terminal and said second terminal, said first capacitor being connected also to said first terminal, the junction of said second network and said second capacitor being connected to one of said deflection plates of said cathode ray tube, the junction of said first capacitor and said first network being connected to the other of said deflection plates, a third network comprising inductance and capacitance connected in series-parallel relation in series with a potentiometer having an adjustable tap, said third network being connected also to said first terminal, said potentiometer being connected to said second terminal, said adjustable tap being connected to the cathode of said cathode ray tube, and a sweep initiating source connected to said means for operating said switching device.

DAVID F. WINTER.

REFERENCES CITED

The following references are of record in the file of this patent:

UNITED STATES PATENTS

| Number | Name | Date |
|---|---|---|
| 2,402,270 | Altanan | June 18, 1946 |
| 2,404,099 | Schade | July 16, 1946 |
| 2,439,313 | Meagher | Apr. 6, 1948 |
| 2,458,366 | Flyer | Jan. 4, 1949 |
| 2,459,278 | Haantjes | Jan. 18, 1949 |
| 2,498,007 | Schade | Feb. 21, 1950 |